(12) United States Patent
Kelly

(10) Patent No.: US 8,996,511 B2
(45) Date of Patent: Mar. 31, 2015

(54) SYSTEM, METHOD, AND COMPUTER PRODUCT FOR PROVIDING SEARCH RESULTS IN A HIERARCHICAL GRAPHICAL FORMAT

(71) Applicant: Envizium, LLC, Olney, MD (US)

(72) Inventor: Zachary Kelly, Olney, MD (US)

(73) Assignee: Envizium, Inc., Olney, MD (US)

( * ) Notice: Subject to any disclaimer, the term of this patent is extended or adjusted under 35 U.S.C. 154(b) by 123 days.

(21) Appl. No.: 13/838,042

(22) Filed: Mar. 15, 2013

(65) Prior Publication Data

US 2014/0280056 A1    Sep. 18, 2014

(51) Int. Cl.
*G06F 17/30* (2006.01)

(52) U.S. Cl.
CPC .... *G06F 17/30554* (2013.01); *G06F 17/30696* (2013.01); *G06F 17/30991* (2013.01); *G06F 17/30716* (2013.01)
USPC ............................ 707/722; 707/706; 707/778

(58) Field of Classification Search
CPC .................... G06F 17/30696; G06F 17/30716; G06F 17/30991
USPC ........................................ 707/722, 766, 778
See application file for complete search history.

(56) References Cited

U.S. PATENT DOCUMENTS

| | | | |
|---|---|---|---|
| 7,027,052 B1 * | 4/2006 | Thorn et al. | 345/440 |
| 7,509,591 B1 | 3/2009 | Thorn et al. | |
| 7,941,429 B2 | 5/2011 | Krovitz et al. | |
| 8,280,902 B2 | 10/2012 | Lewis | |
| 8,335,784 B2 | 12/2012 | Gutt et al. | |
| 2002/0169759 A1 | 11/2002 | Kraft et al. | |
| 2003/0144996 A1* | 7/2003 | Moore, Jr. | 707/3 |
| 2007/0112759 A1* | 5/2007 | Kulakow et al. | 707/5 |
| 2007/0192305 A1* | 8/2007 | Finley et al. | 707/4 |
| 2007/0192313 A1* | 8/2007 | Finley et al. | 707/5 |
| 2008/0243785 A1 | 10/2008 | Stading | |
| 2009/0019031 A1* | 1/2009 | Krovitz et al. | 707/5 |
| 2009/0070321 A1 | 3/2009 | Apartsin et al. | |
| 2012/0120086 A1 | 5/2012 | Dang et al. | |
| 2012/0226971 A1 | 9/2012 | Tocchini et al. | |

* cited by examiner

*Primary Examiner* — James Trujillo
*Assistant Examiner* — Grace Park
(74) *Attorney, Agent, or Firm* — Maier & Maier, PLLC

(57) ABSTRACT

Exemplary embodiments of a system and method for providing search results using an interactive graphical user interface may be described. A system may be configured to receive a search query, transmit the query to a search interface, receive a data set of search results and related search categories, and cause a visual representation of the search results and related search categories to be displayed on a connected device. A search system may further be configured to perform multiple, related searches and determine and recommend related, narrower searches to a user. Search results and recommended, related searches may be delivered to a user's device such that a user can, using an input device, interact with the search results and recommended searches.

14 Claims, 9 Drawing Sheets

SYSTEM, METHOD, AND COMPUTER PRODUCT FOR PROVIDING SEARCH RESULTS IN A HIERARCHICAL GRAPHICAL FORMAT

BACKGROUND

Conventionally, search interfaces are designed to search through large data sets and return data as a list of results, with the most relevant results returned at the top of the list and less relevant results being returned at the bottom of the list. A user is typically presented with a text entry field through which a search query can be transmitted to a search engine, which can be a web search engine such as GOOGLE, YAHOO!, or BING, a search mechanism for a particular website, such as the search functionality on online shopping sites, or systems for searching for data and metadata stored in a computer file system or a database. In response, the search engine examines its index of resources and returns a subset of the index. Typically, these interfaces do not provide for a great deal of user interaction; related searches may sometimes be suggested, but often related search terms are generated from data about popular search queries containing a word or phrase submitted to the search system. Typically, these result data sets are generated from a larger data set created by a web crawler, and the ranking of a particular site is determined by popularity and relevancy to a given term. Relevance is relative to the data set being searched. Algorithms for determining the relevance of data on the web may determine relevance to a query differently than algorithms for searching for content in a relational database, an OLAP database, a non-relational database, a file system, or specialized data sources.

Commonly, hierarchical classifications of data are found in various environments. For example, the Dewey Decimal system used to classify works of literature is a very commonly used hierarchical classification system that breaks down works of literature into ten classes, each of which can have any number of narrower subclasses, and each subclass can be further narrowed. Another example can be found in a typical operating system file system (for example, NTFS, FAT32, or HFS+), where folders and subfolders can be a hierarchical representation of where files may be located on a computer.

While hierarchical classifications are well known, search algorithms often do not use hierarchical search algorithms because a substantial amount of data stored in various electronic formats is unstructured. Because so much data is unstructured and non-hierarchical, the use of visual representations to show hierarchical relationships is limited or non-existent.

SUMMARY

In one exemplary embodiment, a computer-implemented method of providing search results in an interactive, hierarchical graphical format may be disclosed. A first query, which may be formed from a user selection of one or more images, may be provided to a system and transmitted to a search interface. On receipt of a data set of search results, the data set can be transformed into a visual representation for display on a connected device. Related search categories can also be determined from a first query provided by a user, and a visual representation of related search queries may also be displayed on a connected device. The method may further include forming additional queries based on user input and generating a visualization of a data set returned from transmitting an additional query to a search interface.

In another exemplary embodiment, a system for providing search results in an interactive graphical user interface may be disclosed. A system may include an input device, an output device, a processing system, and a transmission system. A processing system may be configured to receive input from a user and form a query based on user input. A transmission system, connectively coupled to the processing system, may transmit the query formed by the processing system to any of a plurality of search interfaces and receive a data set from at least one search interface. The processing system may transform a received data set into a set of machine readable instructions for displaying a visual representation of search results on the connected output device.

In a still further exemplary embodiment, a system and method for generating hierarchies may be disclosed. A processing system may be connected to a plurality of search interfaces. The processing system may generate a hierarchy based on each of the plurality of search interfaces. Hierarchies can be generated from the structure of a database or computer file system, specialized classification systems for specialized data sources, general knowledge sources, and other hierarchical classifications as appropriate for each of the plurality of connected data sources.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of non-transitory computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 1:
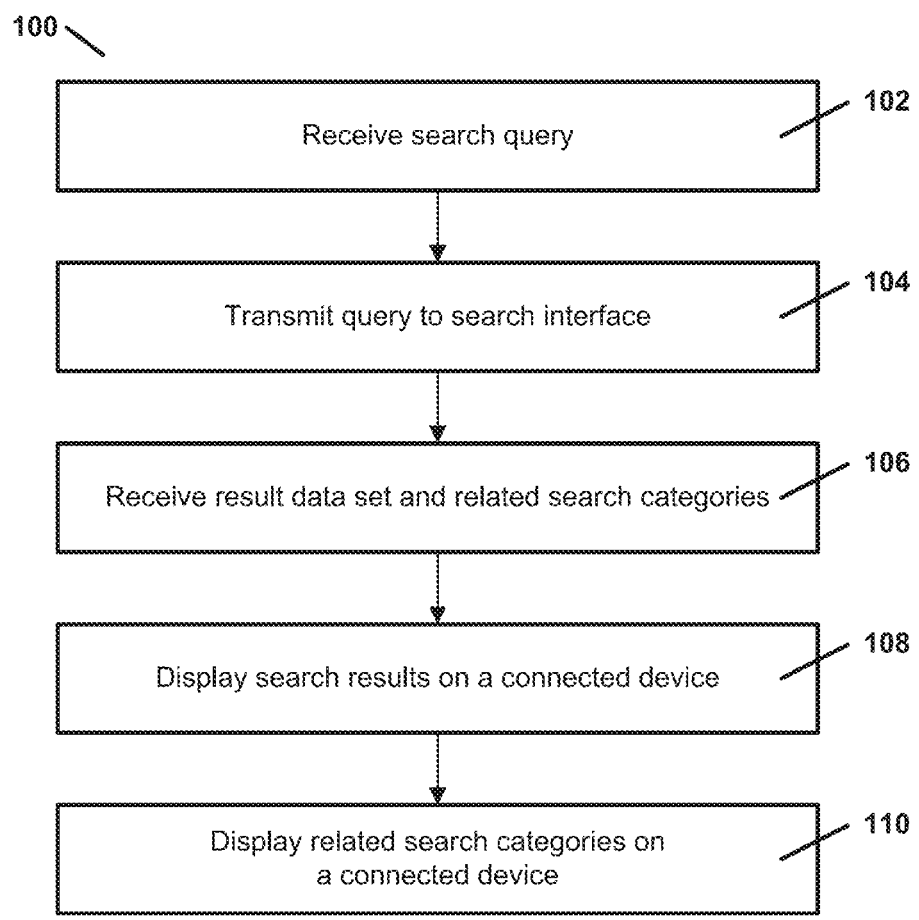
FIG. 1 shows a flow diagram of an exemplary method for providing search results using an interactive graphical user interface (GUI).

FIG. 1 shows an exemplary embodiment of a method 100 for providing search results and related search categories on a device. In the exemplary embodiment, method 100 may be a computer-embodied method of providing search results in an interactive graphical user interface. In query reception step 102, a search query may be provided for transmission to a search interface. In some embodiments, the search query received in a system implementing method 100 may be a user-generated query. In other embodiments, the search query received in query reception step 102 may be generated by a computer system in response to a user input; for example, a query can be built based on a user's selection of a visual representation of an object or concept a user wishes to search. The query received in query reception step 102 may be formed in any desired manner. In some embodiments, the query received in query reception step 102 may be a plain language query; in other embodiments, the received query may be a natural language query; in still further embodiments, the received query may be a Boolean or terms and connectors search; however, it may be recognized by a person skilled in the art that the received query may be of any format accepted by a desired search interface.

At transmission step 104 the search query received at step 102 may be transmitted to at least one search interface. In some embodiments, transmission step 104 may cause a search query to be transmitted to a search interface located on the same device; for example, transmission step 104 may transmit a search query to a file system search interface, a local relational database, a local non-relational database, a local OLAP database, or other appropriate search interface configured to conduct searches on a locally-stored data source. In other embodiments, transmission step 104 may cause a search query to be transmitted to a remote search interface. For example, a query may target information on the internet as a whole, and transmission step 104 may transmit a search query to an internet search engine. In another embodiment, a query may target information on a particular website (for example, an online shopping site), and transmission step 104 may transmit a search query to that website's search interface.

Reception step 106 may receive the results of a search from a search interface queried by transmission step 104. In some embodiments, a result data set may include at least one search result, at least one related search query, or both at least one search result and at least one related search query. Reception step 106 may be configured to receive search results in any machine readable format returned by the search interface.

Search result display step 108 may receive the data set of search results from reception step 106 and transform the raw data set into a machine-readable visualization. This may be accomplished according to an exemplary method 600 as shown in FIG. 6.

Figure 6:
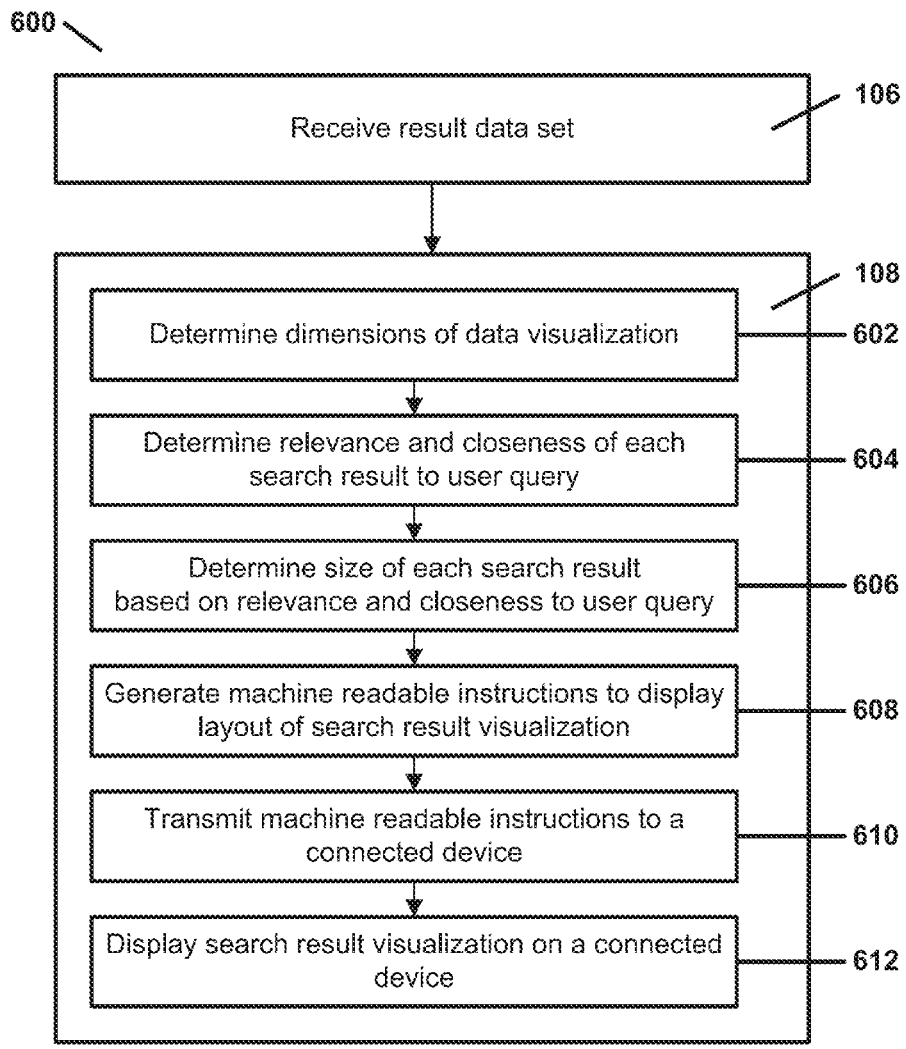
FIG. 6 shows a flow diagram of an exemplary method of displaying search results in a computer-generated visualization where the size of each result varies based on relevance and closeness to the original search query.

FIG. 6 shows an exemplary method 600 of delivering a visualization of search results as a tree map having predetermined dimensions and where each of the plurality of search results has a size corresponding to the relevance and closeness of each of search result to the user's query. Dimension determination step 602 may set the boundaries of the data visualization. In some embodiments, step 602 may set the boundaries dynamically based on the pixel resolution of an output device and the desired size of the data visualization; in other embodiments, step 602 may receive inputs from a system fixing the height and width of the data visualization.

Relevance determination step 604 may iterate through each of the one or more search results received from reception step 106 and determine how relevant each of the one or more search results is. In some embodiments, where a search interface may return a data set where each result comprises an n-tuple of at least a description of the result and a relevancy score or rank, relevance determination step 604 may be omitted. In other embodiments, relevance determination step 604 may iterate through each of the one or more search results and generate a score embodying the relevance and closeness of each of the one or more search results to the original search query. In still further embodiments, relevance determination step 604 may iterate through each of the one or more search results and generate a ranking of each of the one or more search results. After scoring or ranking, relevance determination step 604 may further re-order the data set of search results in any desired order; for example, relevance determination step 604 may order the data set of search results such that the most relevant or highest ranked result is the first element of the data set; in other embodiments, the most relevant or highest ranked result may be in the exact middle of the data set or in any other appropriate position as known in the art. In an exemplary embodiment, determinations of relevance and closeness can be made by determining the proportion of a transmitted search query that appears in a search result; search results containing more of a transmitted search query may rank higher in relevance and closeness than search results containing less of a transmitted search query.

The data set generated by relevance determination step 604 may then be used in size determination step 606. Size determination step 606 may use the ranking or relevance score of each of the one or more results in the data set to determine the size of each search result. In some embodiments, each of the one or more results in the data set can be assigned a different size; in other embodiments, the data set can be divided into any number of groups, each of which may be assigned the same size. In an embodiment, the results having the highest rank or relevance scores may be assigned the largest sizes, and less relevant results can progressively be reduced in size.

Visualization instruction generation step 608 may generate instructions for a connected device to display a visualization of the data set returned by a search interface and sized in step 606. If a tree map visualization is desired, visualization instruction generation step 608 may use a harmonious tiling algorithm where the visualization does not contain unused space; in other embodiments, visualization instruction generation step 608 may use a non-harmonious tiling algorithm where the visualization may contain unused space where the next entry in the data set would not fit in the dimensional constraints of the data set. Visualization instruction generation step 608 may generate visualizations using tree map algorithms, algorithms for generating branching and/or radial maps, or any other visualization as desired and known in the art.

Transmission step 610 may transmit the instructions generated by visualization instruction generation step 608 to a connected device. In some embodiments, transmission step 610 may transmit the visualization instructions over a network. The network may be a wireless local area network, a wireless wide area network, a wired network, line-of-sight communication, a wireless personal area network, or any other communication network as desired and known in the art. In other embodiments, transmission step 610 may transmit the visual instructions to a visual processor on the same device. Transmission step 610 may transmit a command to cause a connected device to perform display step 612 to display the search result visualization on a connected device. In some embodiments, only a portion of a visualization generated by visualization instruction generation step 608 may be displayed to a user. Display step 612 may be configured to update the portion of a visualization displayed to a user as a user scrolls through the search results.

Turning back to FIG. 1, related search category display step 110 may receive a data set of related search categories from step 106 and display the related search categories on a connected device. Instructions to display a three-dimensional shape with any number faces may be generated; in some embodiments, the number of faces may be determined by the number of related search categories returned by step 106. Each of the related search categories can be displayed on a face of a generated three-dimensional shape. In some embodiments, each related search category can be displayed as text; in other embodiments, each related search category can be displayed as an image, each image comprising a face of a generated three-dimensional shape. Instructions for creating the three-dimensional shape can also contain instructions for allowing a user to interact with the three-dimensional shape embodying the set of related search categories such that the three dimensional shape can be rotated in any direction and a selection of a face causes a search query related to the selected category to be created and executed. In some embodiments, visualizations generated from a data set of related search categories returned by step 106 may be displayed in addition to a pre-determined visualization showing any number of potential search categories. These potential search categories may be high-level concepts; for example, for a search interface directed to an online store, the search categories generated for a search category visualization maybe information about various store departments (e.g. home, electronics, etc.) or brands.

Figure 2:
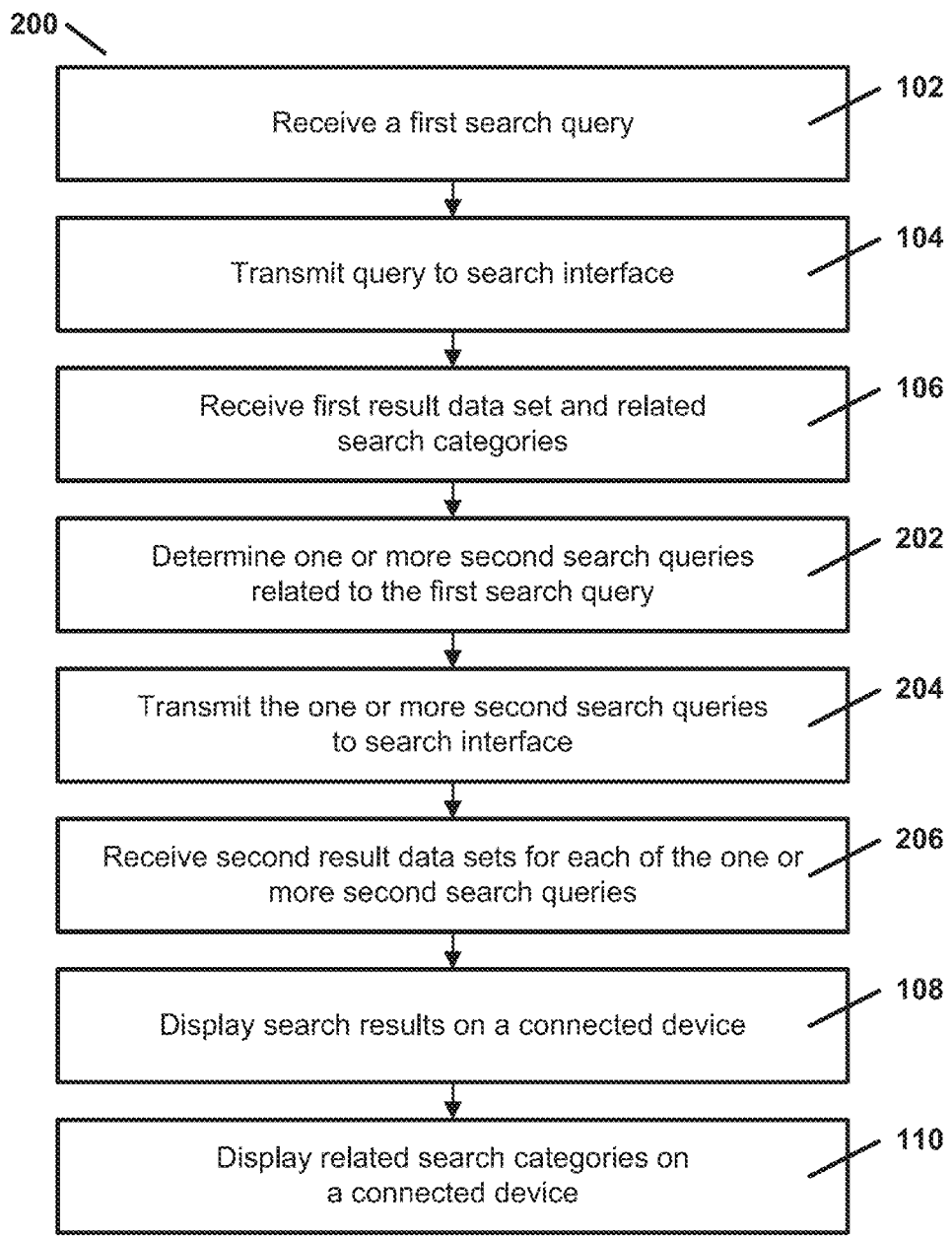
FIG. 2 shows a flow diagram of an exemplary method for providing results of related searches adjacent to the results of a user's search query.

In another exemplary embodiment, as shown in FIG. 2, a method 200 may be a computer-embodied method for providing search results of a user provided query and at least one related, computer-generated query in an interactive graphical user interface. Related query generation step 202 may generate at least one query related to the first query, which may be provided by a user or generated from a selection of a search result or a related search category. In some embodiments, at least one related search query can be generated from a hierarchical classification of the first query. Related search queries may also be returned from a search interface, generated from data about other searches performed by users who conducted a search using the first query, or any other appropriate method as known in the art.

Each of the at least one related queries generated by related query generation step 202 may be transmitted to a search interface in second transmission step 204, which may be operatively similar to first transmission step 104. Second reception step 206 may then receive each of the one or more search result data sets for each of the one or more related queries transmitted to a search interface in second transmission step 204. Both the first data set received in first reception step 106 and each of the one or more second data sets received in second reception step 206 may be transformed into a set of machine readable instructions for visualizing each of the search result data sets in display step 108, as described above.

In some embodiments, the first visualization generated from the first data set received in first reception step 106 and each of the one or more second visualizations generated from each of the one or more second data sets received in second reception step 206 may be visually distinguishable. Each of the search result visualizations may have a unique size when displayed on a connected device. Each of the search result visualizations may also have a unique color when displayed on a connected device. Still further, each of the one or more search result visualizations may be distinguished by using different fonts, different font styles, or other visual differentiations as known in the art.

Within each of the one or more search result visualizations, each search result may also be visually distinguishable. In some embodiments, search results may be distinguishable by the size of each result in a visualization. In other embodiments, each search result may be displayed in a different shade of a color family used for the search result visualization. A predetermined color palette may be defined for use in displaying each of the one or more search result visualizations. The color chosen for a search result visualization may be randomly selected or user defined.

Figure 3:
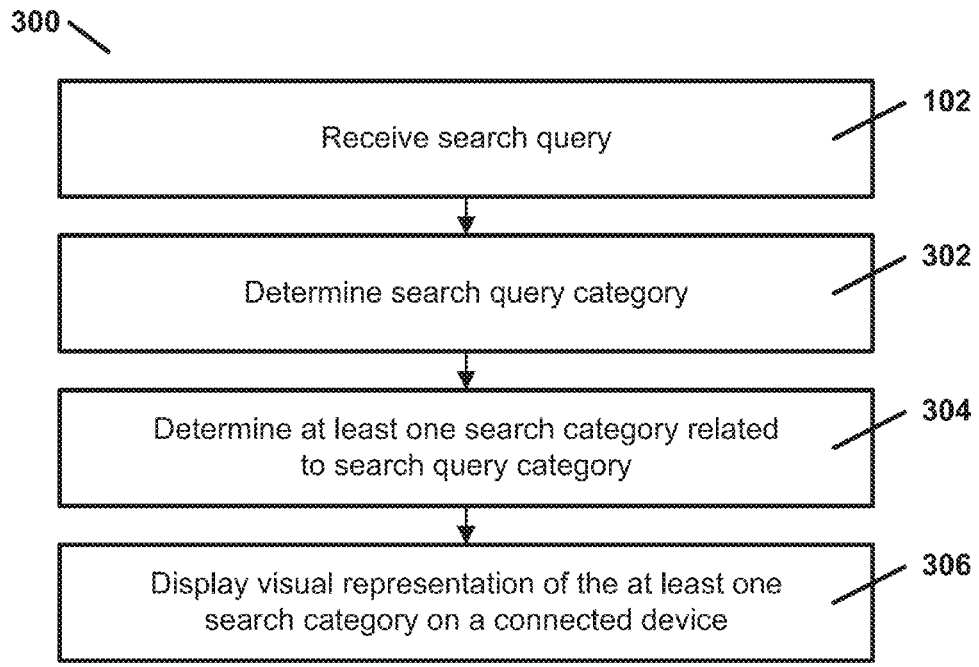
FIG. 3 shows a flow diagram of an exemplary method for providing related search categories based on a user provided search query.

In an exemplary embodiment, as shown in FIG. 3, method 300 may be a computer-embodied method for determining at least one related search result based on a first search query received from a user. Query category determination step 302 may receive a search query and parse the search query to determine the general classification of data a user is requesting from the search query. The determined classification may be examined against at least one classification of data. In some embodiments, classifications of data may be generated based on the data source a user desires to search; dynamic generation of a hierarchy and classifications of data may be performed, for example, where the data source is large and unstructured. In other embodiments, hierarchies and data classifications may be predefined and tailored to a specific data source. In some embodiments, query category determination step 302 may generate a determined classification based on the closest match in a determined hierarchical classification. Related search category determination step 304 may determine at least one search category related to a first search query received from a user based on the query category determination made in step 302. In some embodiments, related search category determination step 304 may return at least one related search category. The at least one related search category may be a similar search category, a narrower search category, or a broader category encompassing the subject matter of the first search query as well as other information. Related search category display step 306 may transform the at least one related search category into machine-readable instructions for displaying said at least one related search category as a visual representation on a connected device.

Figure 4:
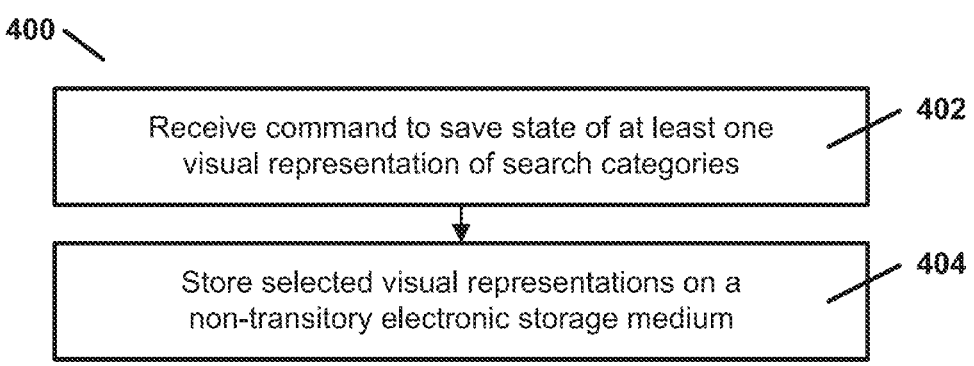
FIG. 4 shows a flow diagram of an exemplary method of providing related search categories based on a user provided search query and saving said search categories in non-transitory electronic storage.

FIG. 4 shows an exemplary method 400 of saving the state of at least one visualization of related search categories in a non-transitory electronic storage medium. Computer-embodied method 400 may allow a user to save at least one visual representation of suggested search categories in a non-transitory electronic storage medium. Command reception step 402 may receive a command indicating that a user wishes to save the state of one or more visual representations of suggested search categories. A command may be configured in any desired fashion such that an interpretation of said command would cause the storage of the desired one or more visual representations by storage step 404. Storage step 404 may allow a user to store any number of desired visual representations of suggested search categories on a non-transitory electronic storage medium integral to a connected device. For example, storage step 404 may store visual representations of suggested search categories on a removable disk, solid state storage, a hard drive, or any other desired storage medium connectively coupled to a connected device. In other exemplary embodiments, storage step 404 may be configured to cause visual representations of suggested search categories to be stored in online or networked storage. In some embodiments, storage step 404 may cause visual representations of suggested search categories to be stored in a database and mapped to a particular user; in other embodiments, storage step 404 may cause visual representations of suggested search categories to be stored as flat files or other machine-readable implementations, said flat files or other machine-readable implementations having unique identifiers. Said unique identifiers can be stored on any desired storage medium connectively coupled to a connected device to allow a connected device to access the saved visual representations on online or network storage.

Figure 5:
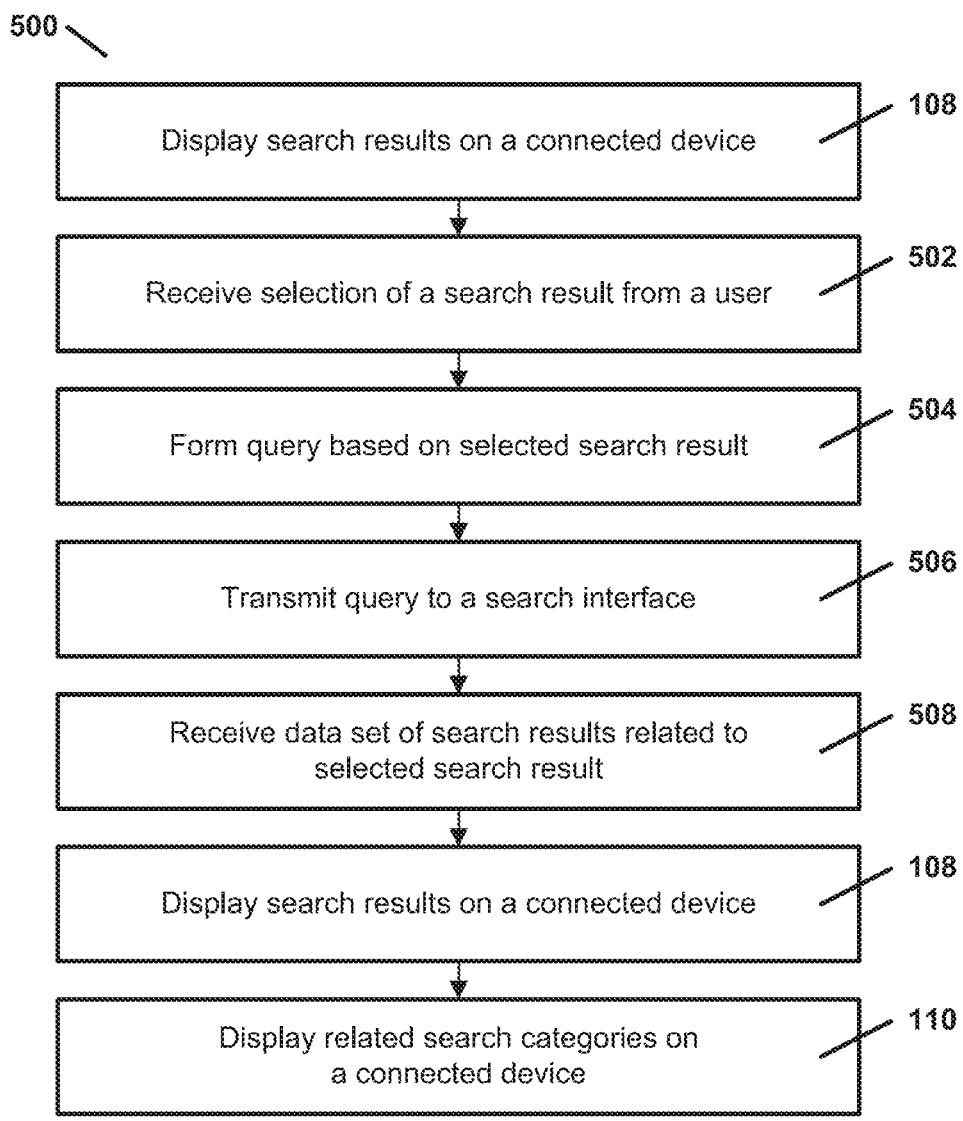
FIG. 5 shows a flow diagram of an exemplary method of providing search results using an interactive graphical user interface wherein the search results are generated based on a user's selection of a result from a previous search.

FIG. 5 shows an exemplary embodiment of a method 500 for delivering search results using an interactive graphical interface, said results being generated from a user selection of a result from a previous search. Selection reception step 502 may receive an input of a user selection of a discrete search result. Query formation step 504 may take the input of a discrete search result and form a query to search for information related to the selected discrete search result. Said query may be formed in step 504 as a natural language query, a plain language query, a Boolean terms and connectors query, or any other desired search query format as appropriate. Transmission step 506 may transmit the query formed in query formation step 504 to a search interface. Reception step 508 may receive a data set of search results responsive to the query transmitted in step 506. The received data set of search results may be displayed on a connected device by search result display step 108. In some embodiments, search result display step 108 may be configured to display an additional visualization adjacent to the one or more visualizations already displayed on a connected device; in other embodiments, search result display step 108 may be configured to clear the one or more visualizations from a connected device's output device and display a visualization of the search results received by reception step 508.

Figure 7:
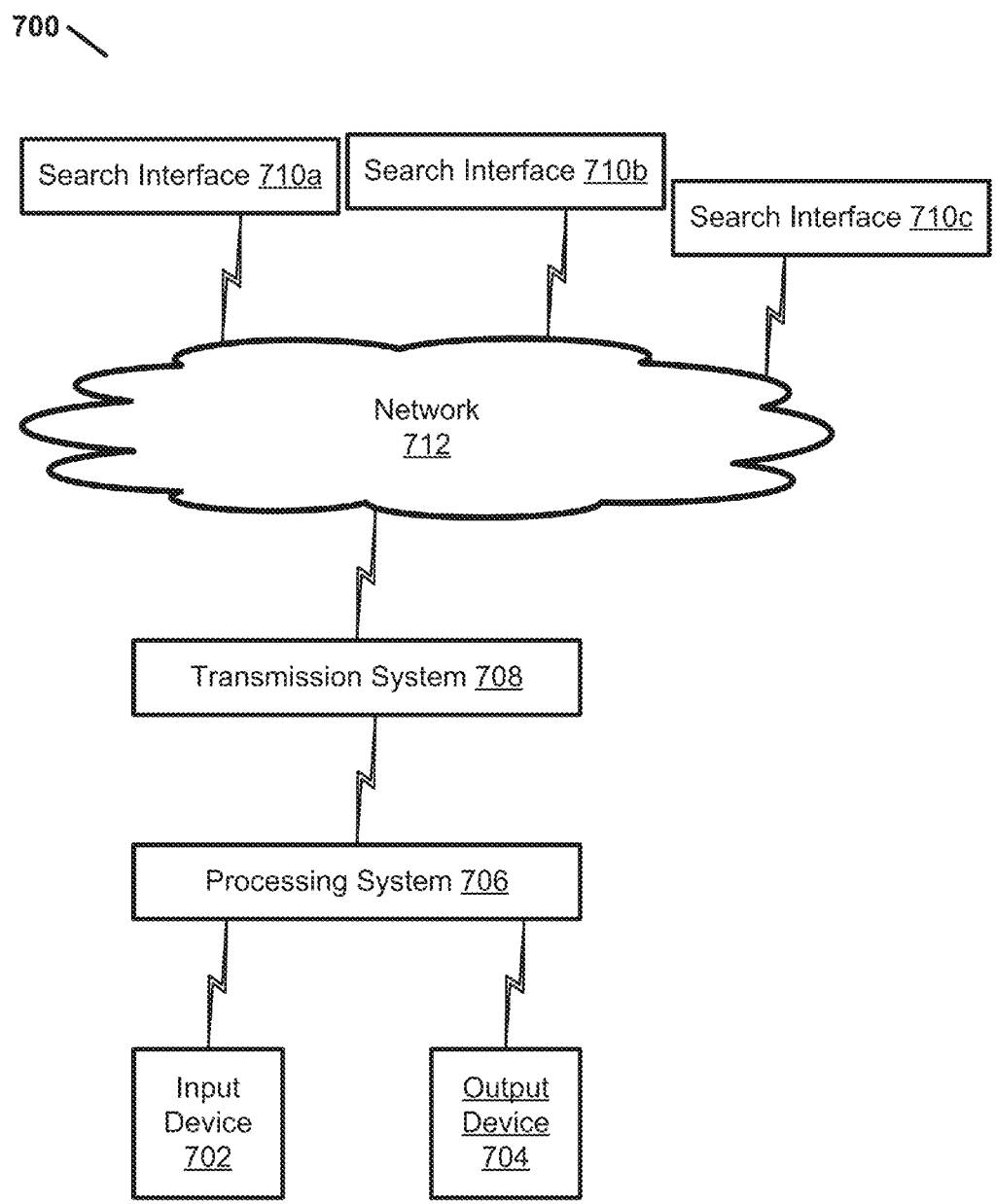
FIG. 7 shows a diagram of a an exemplary system for delivering search results on an interactive graphical user interface.

Referring to FIG. 7, an exemplary embodiment of a system for providing search results to a user using an interactive graphical user interface may be disclosed. Search system 700 may comprise at least one input device 702, at least one output device 704, at least one processing system 706, at least one transmission system 708, and at least one search interface 710. The at least one input device 702 and at least one output device 704 may be connectively coupled to at least one processing system 706. In some embodiments, the at least one input device 702 and at least one output device 704 may be discrete devices. Input device 702 may include keyboards, mice, touchpads, pen-activated tablets, or other appropriate computer input devices as known in the art. Output device 704 may include display devices, sound devices, or other appropriate computer output devices as known in the art. In other embodiments, input device 702 and output device 704 may be combined in a single device. The combination of input device 702 and output device 704 may be a capacitive touch screen, a resistive touch screen, a pen-activated screen, or any other appropriate combination of an input device 702 and output device 704 as known in the art. A user may generate an input using input device 702, and input device 702 may transmit said user-generated input to processing system 706. Processing system 706 may be configured to form a query from the user-generated input provided from input device 702. Said query generated by processing system 706 may be transmitted to at least one search interface 710 through transmission system 708. In some embodiments, transmission system 708 may be an application programming interface; in other embodiments, transmission system 708 may be a wired network device, a wireless local area network device, a wireless wide area network device, a wireless personal area network device, or any other appropriate communication device as known in the art. A plurality of search interfaces 710 may be connectively coupled to transmission system 708. In some embodiments, one or more search interfaces and transmission system 708 may be connected to a network 712. Network 712 may be a local area network, a wide area network, the internet, or any other desired network. A selected search interface 710 may receive a query generated by processing system 706 through transmission system 708 over a network 712 and generate a data set of search results. The data set of search results may be transmitted through network 712 to transmission system 708, and transmission system 708 may transmit the received data set of search results to processing system 706. Processing system 706 may further be configured to transform the received data set of search results into a machine readable code for displaying said received data set in a visualization and may cause output device 704 to display the visualization generated by processing system 706.

Figure 8:
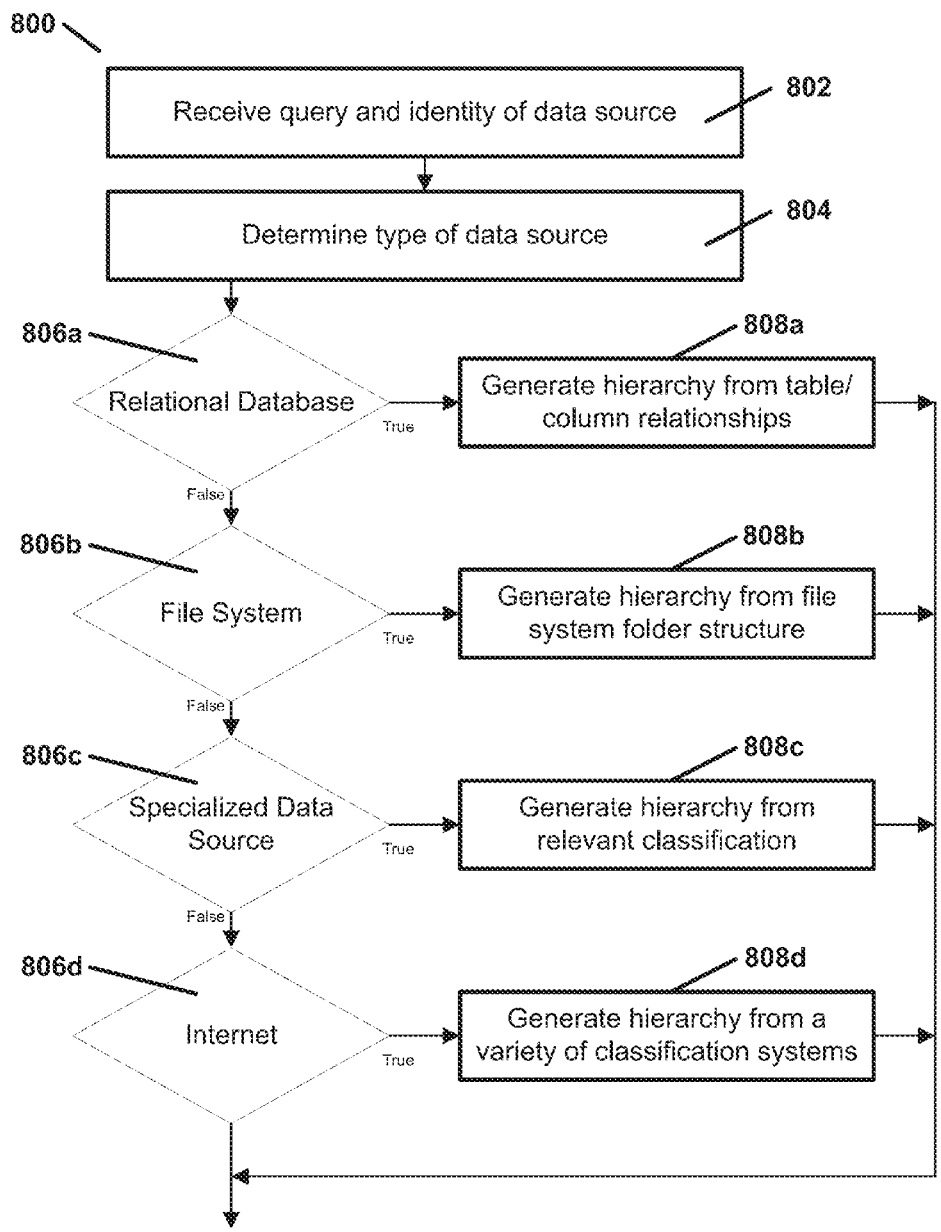
FIG. 8 shows a flow diagram of an exemplary method for generating a search category hierarchy based on a specified target data source.

Referring now to FIG. 8, a method 800 may be a computer-embodied method of generating search hierarchies based on the data source being queried. Reception step 802 may receive a query and an identity of a data source to be queried. Data source determination step 804 may receive the identity of a data source to be queried from reception step 802. Decision steps 806 may iterate through the types of data sources connected to a system. If, as in step 806a, the queried data source is a relational database, hierarchy generation step 808a may be executed to generate a hierarchy from table and column relationships in the relational database. If the data source is a file system, decision step 806b may cause hierarchy generation step 808b to be executed to generate a hierarchy from the folder structure of the file system. If the data source is a specialized data source, decision step 806c may cause the execution of hierarchy generation step 808c to generate a hierarchy relevant to the type of data embodied in said specialized data source. If the data source is the broader internet, decision step 806d may cause hierarchy generation step 808d to be executed, which may generate a hierarchy from a variety of classification systems. Further decision steps 806 and hierarchy generation steps may be added as appropriate to generate hierarchical classifications for any type of supported data source that may be queried by a user.

Figure 9:
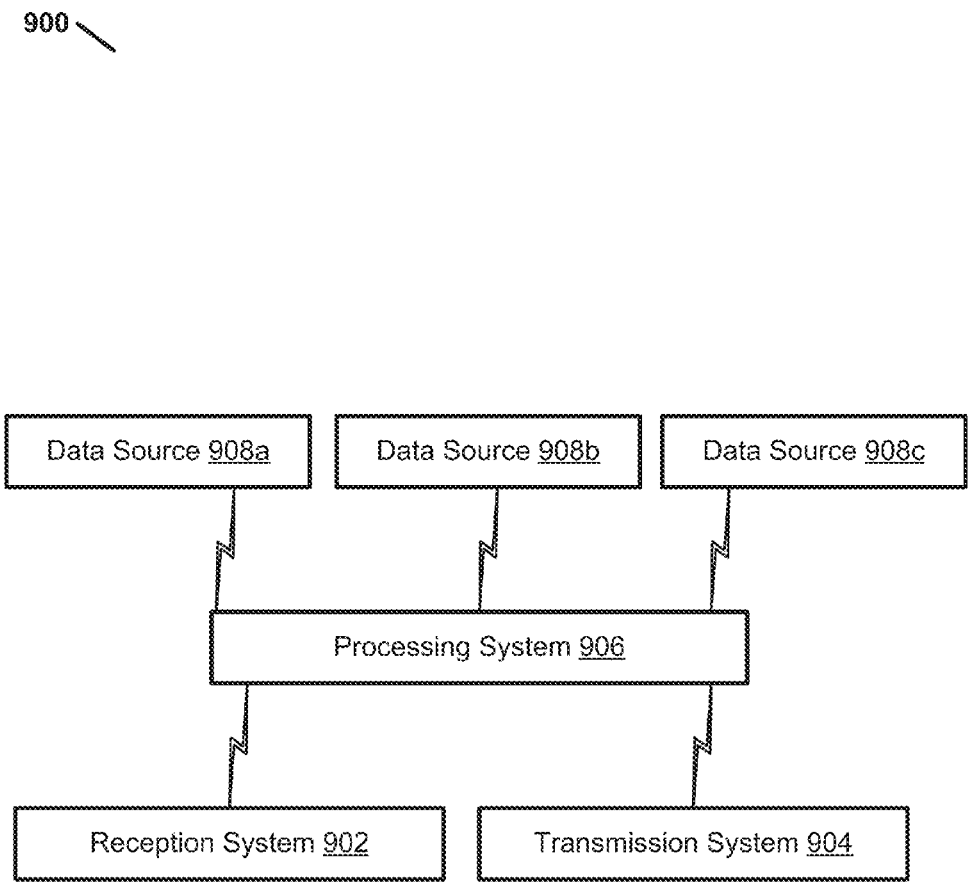
FIG. 9 shows a diagram of an exemplary system for generating search category hierarchies for a plurality of connected data sources.

Referring specifically to FIG. 9, a system 900 for generating hierarchical classifications from data sources for recommending search categories to a user may be disclosed. System 900 may comprise a reception system 902, a transmission system 904, a processing system 906, and one or more connected data sources 908. Reception system 902 may be configured to receive an identity of a target data source a user desires to obtain data from. Reception system 902 may be connectively coupled to processing system 906. Processing system 906 may receive an input from reception system 902, access the appropriate data source 908 specified by the input from reception system 902, determine the type of data source the user requested, and generate a search hierarchy based on the data source requested. In some embodiments, processing system 906 may have access to one or more predetermined search hierarchies and may improve and change any of the one or more predetermined search hierarchies based on user behavior and the underlying data source. For example, processing system 906 may modify a search hierarchy linked to a relational or nonrelational database when the structure of the underlying database changes. In some exemplary embodiments where the underlying data source is broad and unstructured, processing system 906 may generate a hierarchy based on a variety of general hierarchies of electronic data, such as the W3C semantic web, as well as any desired variety of knowledge-based hierarchies. A transmission system 904, connectively coupled to processing system 906, may receive a generated hierarchy and transmit the generated hierarchy to a connected system. Transmission system 904 may transmit a generated hierarchy using an application programming interface, a wired network interface, a wireless local area network, a wireless cellular network, a wireless personal area network, or any other appropriate transmission system known in the art.

Figure 10:
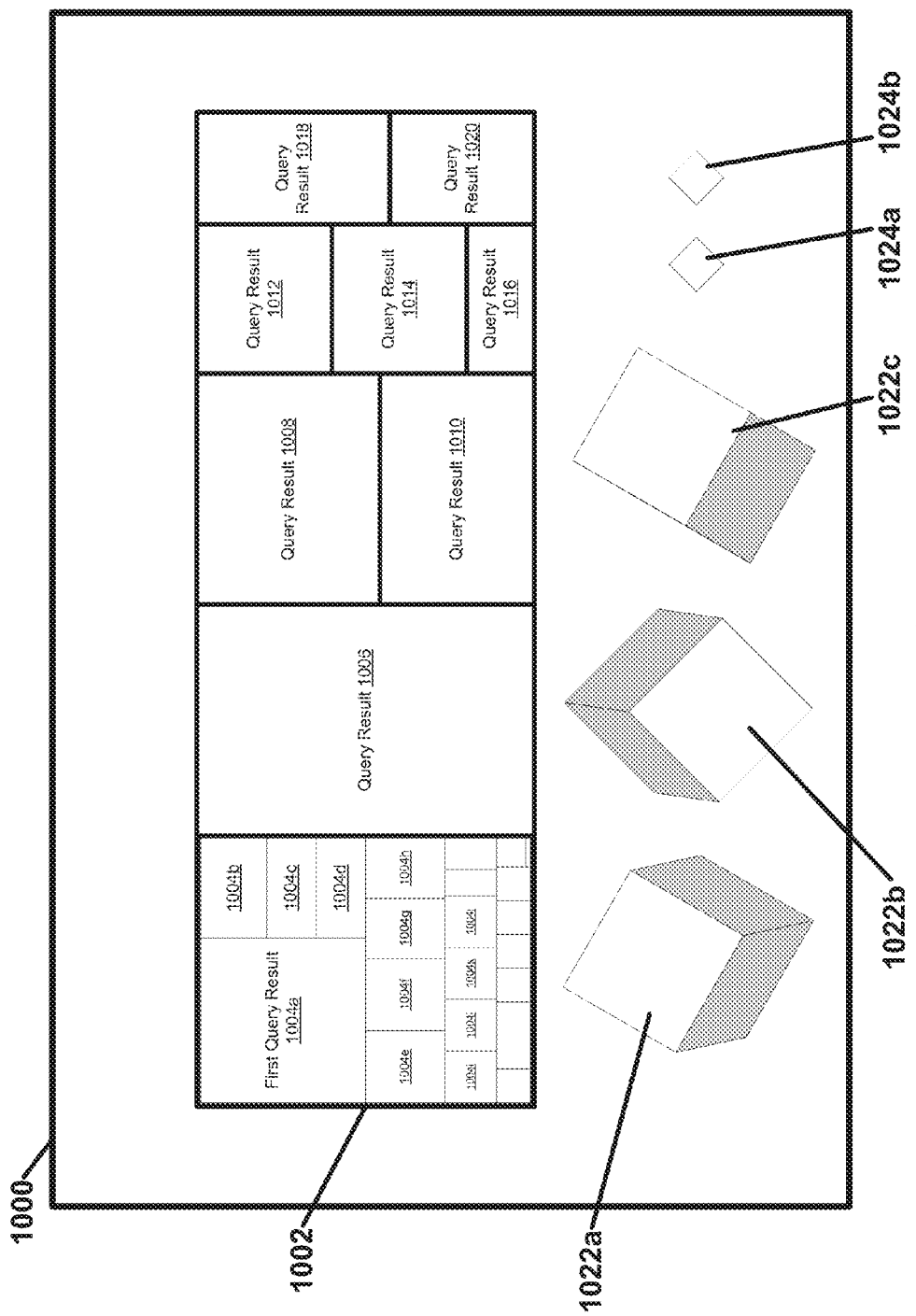
FIG. 10 shows an illustration of an exemplary user interface for displaying a plurality of search result data sets and a plurality of recommended search categories.

Now referring to FIG. 10, an exemplary embodiment of an interactive graphical user interface for displaying search results and visualizations of recommended search categories may be disclosed. Interface 1000 may have a data visualization container 1002, at least one recommended search category visualization 1022, and at least one recommended search category visualization placeholder 1024. In some embodiments, data visualization container 1002 may contain a visualization for a first query result 1004. Data visualization container 1002 may further contain visualizations for any number of additional query results, represented by the reference numerals 1006, 1008, 1010, 1012, 1014, 1016, 1018, 1020, from related search queries generated by a processing system and transmitted to an appropriate search interface. In each of the one or more visualizations contained in data visualization container 1002, a query data set may be represented by any number of uniquely sized subcontainers, shown as reference numerals 1004a . . . 1004l. In an exemplary embodiment, the most relevant result 1004a may be displayed as the largest element in a data visualization. Less relevant results may be displayed in varying sizes, with the relative size of each result representing the relevance of said result. Any number of recommended search category visualizations 1022 may be present on the user interface; in an embodiment, visualization 1022a may contain broader categories than visualization 1022b, which may contain broader categories than 1022c, and so on. As a user selects a surface on a search category visualization 1022, further search category visualizations 1022 may replace a recommended search category visualization placeholder 1024. In some embodiments, the first additional search category visualization 1022 may replace a first placeholder 1024a, the second recommended search category visualization may replace a second placeholder 1024b, and so on. In another embodiment, a plurality of previously displayed search category visualizations may be hidden as a user generates additional search category visualizations, and a user can scroll to view any hidden search category visualizations as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of providing search results using an interactive graphical user interface, comprising:
receiving a first search query;
transmitting the first search query to a search interface;
receiving a data set of search results having at least one data entry;
determining at least one search category related to the search query;
causing to be displayed on a connected device a first data visualization containing the contents of the received data set of search results;
causing to be displayed at least one visual representation of the at least one search category related to the search query
determining one or more second search queries related to the first search query,
transmitting at least one related search query to a search interface
receiving a data set of search results for each of the at least one related search queries;
causing to be displayed on a connected device, adjacent to the first data visualization, at least a second visually distinguishable data visualization containing the contents of the data set of search results generated by the at least one related search query;
determining a plurality of related search subcategories, wherein the plurality of related search subcategories are a subclass of the at least one related search query transmitted to the search interface; and
causing to be displayed an additional visual representation of the plurality of related search subcategories, wherein the additional visual representation is a three-dimensional interactive structure having a plurality of surfaces, wherein each of the plurality of surfaces is associated with one of the plurality of related search subcategories, and selection of a surface displays at least one further visual representation;
wherein the search categories related to the search query, and the plurality of related search subcategories are generated from a hierarchical classification such that search results are displayed by the first visual representation, second visual representation and additional visual representations in a hierarchical graphic format.

2. The method of claim 1, further comprising causing to be displayed on a connected device at least one visual representation of one or more initial search categories.

3. The method of claim 2, wherein the one or more initial search categories are derived from the broadest data categories of a selected data hierarchy.

4. The method of claim 1, wherein the first search query is received from a selection of an image.

5. The method of claim 1, wherein the first search query is received from a user-generated textual input.

6. The method of claim 1, wherein the at least one visual representation of search categories is an interactive, three-dimensional structure having a plurality of sides configured to display a visual representation of a search category related to the search query.

7. The method of claim 1, wherein the data visualization containing the contents of the received data set of search results is a tree map.

8. The method of claim 1, further comprising loading from a nontransitory electronic storage medium at least one visual representation of search categories.

9. The method of claim 1, further comprising:
receiving a user input relating to a selected search result displayed in at least one tree map;
forming a query based on the selected search result;
transmitting the query to a search interface;
receiving a data set of search results generated by the search interface; and
causing to be displayed on a connected device a tree map containing contents of the received data set of search results.

10. The method of claim 1, wherein each of the at least one data entries is displayed in varying sizes corresponding to the relevance and closeness of each of the at least one data entries to the original search query in the tree map.

11. A non-transitory computer readable medium storing a set of computer readable instructions that, when executed by one or more processors, causes a device to perform a process comprising:
receiving a search query;
transmitting the search query to a search interface;
receiving a data set of search results having at least one data entry;
causing to be displayed on a connected device a first visualization containing the contents of the received data set of search results;
causing to be displayed on a connected device at least one visual representation of search categories related to the search query;
transmitting at least one related search query to a search interface;
receiving a data set of search results for each of the at least one related search queries;
causing to be displayed on a connected device, adjacent to the first data visualization, at least a second data visualization containing the contents of the data set of search results generated by each of the at least one related search queries
determining a plurality of related search subcategories, wherein the plurality of related search subcategories are a subclass of the at least one related search query transmitted to the search interface; and
causing to be displayed an additional visual representation of the plurality of related search subcategories, wherein the additional visual representation is a three-dimensional interactive structure having a plurality of surfaces, wherein each of the plurality of surfaces is associated with one of the plurality of related search subcategories, and selection of a surface displays at least one further visual representation;
wherein the search categories related to the search query, and the plurality of related search subcategories are generated from a hierarchical classification such that search results are displayed by the first visual representation, second visual representation and additional visual representations in a hierarchical graphic format.

12. The non-transitory computer readable medium of claim 11, further comprising a set of computer readable instructions for:
receiving a command to save the state of at least one visual representation of search categories; and
storing in a non-transitory electronic storage medium the at least one visual representation of search categories or search subcategories.

13. The non-transitory computer readable medium of claim 11, further comprising a set of computer readable instructions for:
receiving a user input relating to a selected search result displayed in at least one data visualization;
forming a query based on the selected search result;
transmitting the query to a search interface;
receiving a data set of search results generated by the search interface; and
causing to be displayed on a connected device a tree map containing contents of the received data set of search results.

14. The method of claim 1, further comprising:
receiving a command to save the state of at least one visual representation of search categories; and
storing in a nontransitory electronic storage medium the at least one visual representation of search categories or search subcategories.

* * * * *